(12) United States Patent
Remes

(10) Patent No.: US 9,506,426 B2
(45) Date of Patent: Nov. 29, 2016

(54) METHODS AND SYSTEMS FOR RECYCLING ENGINE FEEDGAS COLD-START EMISSIONS

(71) Applicant: Ford Global Technologies, LLC, Dearborn, MI (US)

(72) Inventor: Enrique Remes, Huixquilucan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/223,837

(22) Filed: Mar. 24, 2014

(65) Prior Publication Data

US 2015/0267649 A1  Sep. 24, 2015

(51) Int. Cl.

| F02B 33/44 | (2006.01) |
|---|---|
| F02M 25/07 | (2006.01) |
| F02D 41/06 | (2006.01) |
| F01N 3/20 | (2006.01) |
| F02D 41/00 | (2006.01) |

(52) U.S. Cl.
CPC ............ *F02M 25/0706* (2013.01); *F01N 3/20* (2013.01); *F02D 41/0055* (2013.01); *F02D 41/064* (2013.01); *F02M 26/04* (2016.02); *F02M 26/06* (2016.02); *F02D 41/0007* (2013.01); *F02D 41/0065* (2013.01); *F02D 2200/0802* (2013.01); *F02M 26/05* (2016.02); *Y02T 10/47* (2013.01)

(58) Field of Classification Search
CPC .................... F02M 25/0709; F02M 25/0719; F02M 26/05; F02B 37/18; F01N 3/00; F01N 3/26; F01N 3/28; F01N 3/20; Y02T 10/144; F02D 41/064
USPC ................. 60/605.2, 602, 282, 299, 605.1; 123/568.11

See application file for complete search history.

(56) References Cited

U.S. PATENT DOCUMENTS

| 5,125,231 A | 6/1992 | Patil et al. |
|---|---|---|
| 6,171,556 B1 | 1/2001 | Burk et al. |
| 6,626,162 B2 | 9/2003 | Shelor et al. |
| 7,512,479 B1* | 3/2009 | Wang ....................... 123/568.21 |
| 8,464,524 B2 | 6/2013 | Bidner et al. |
| 2003/0234378 A1* | 12/2003 | Hartley ......................... 137/595 |
| 2004/0093866 A1* | 5/2004 | Ishikawa ...................... 60/605.2 |
| 2006/0283429 A1* | 12/2006 | Kuhnel et al. ........... 123/568.18 |
| 2007/0246028 A1* | 10/2007 | Fujita et al. .................. 60/605.2 |
| 2009/0277431 A1* | 11/2009 | Nitzke et al. ................ 60/605.2 |
| 2011/0225955 A1* | 9/2011 | Kimura et al. .................. 60/278 |
| 2011/0289918 A1* | 12/2011 | Wada .................. F02M 25/0718  60/605.2 |
| 2012/0159934 A1* | 6/2012 | Itoh .................................. 60/279 |
| 2012/0234002 A1* | 9/2012 | Lombard .............. F02B 37/183  60/602 |
| 2012/0279216 A1* | 11/2012 | Otsuka .......................... 60/602 |

(Continued)

OTHER PUBLICATIONS

Anonymous, "Method for reducing cold start emissions by applying a rich pulse during lean operating engine shut down," IPCOM No. 000212173, Published Nov. 3, 2011, 4 pages.

*Primary Examiner* — Nicholas J Weiss
*Assistant Examiner* — Ngoc T Nguyen
(74) *Attorney, Agent, or Firm* — Julia Voutyras; Alleman Hall McCoy Russell & Tuttle LLP

(57) ABSTRACT

Systems and methods are provided for recycling internal combustion engine feedgas exhaust emissions during cold-start conditions. By adjusting a restriction valve provided in an exhaust passage upstream of a catalytic converter, an amount of engine exhaust flowing through the catalytic converter prior to the catalytic converter reaching its operational temperature may be reduced.

18 Claims, 8 Drawing Sheets

(56) References Cited

U.S. PATENT DOCUMENTS

2013/0186074 A1* 7/2013 Kanba et al. .................... 60/286
2013/0312391 A1* 11/2013 Cavataio et al. ................ 60/274
2014/0130483 A1* 5/2014 Miyake ........................... 60/285
2014/0216422 A1* 8/2014 Park et al. ................ 123/568.11
2014/0331651 A1* 11/2014 Nishikiori ....................... 60/285
2014/0352669 A1* 12/2014 Cunningham et al. .. 123/568.11
2015/0047346 A1* 2/2015 Styles et al. .................. 60/605.2
2015/0082790 A1* 3/2015 Yoshioka et al. ............ 60/605.2

* cited by examiner

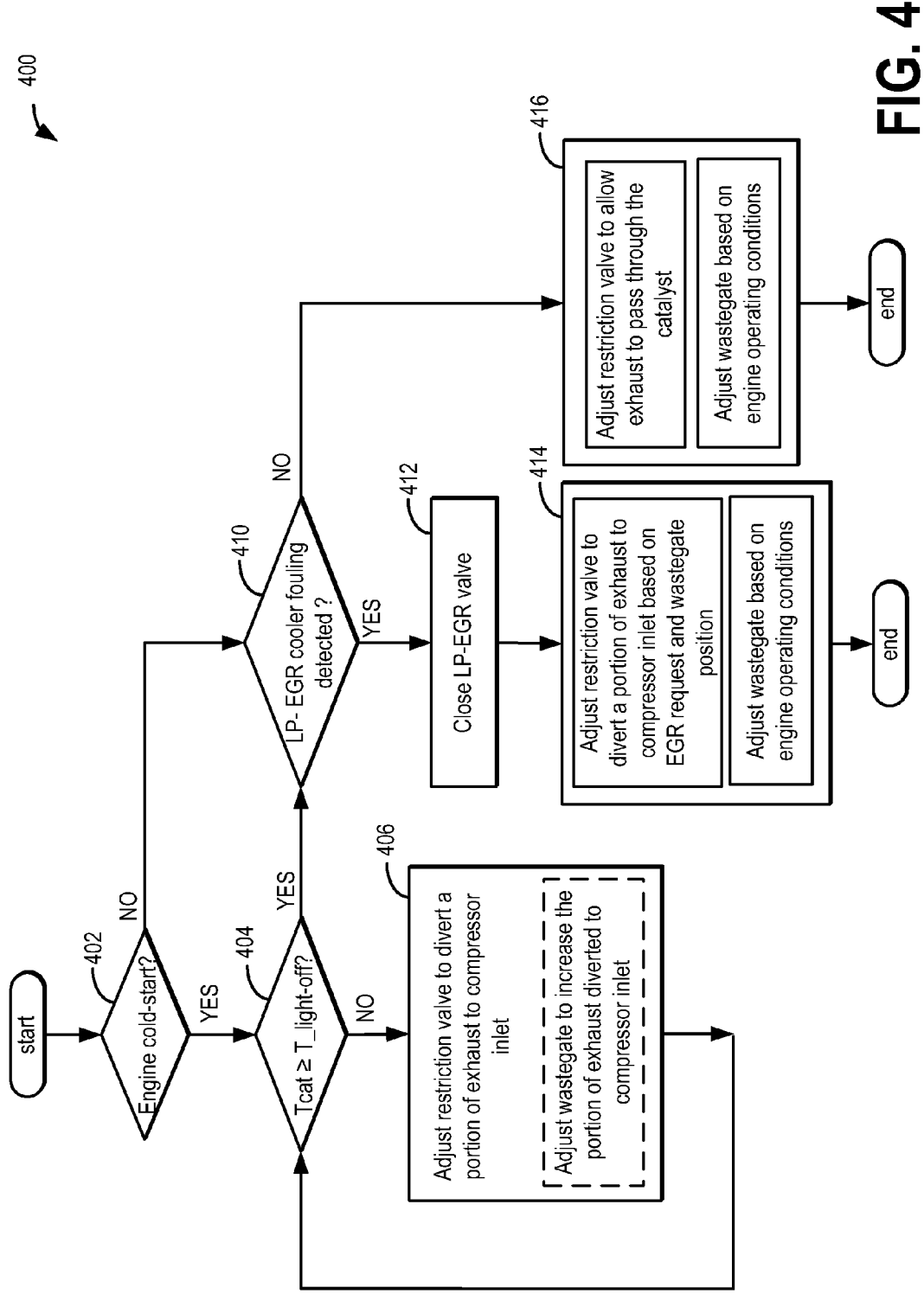

METHODS AND SYSTEMS FOR RECYCLING ENGINE FEEDGAS COLD-START EMISSIONS

FIELD

The present description relates to systems and methods for recycling internal combustion engine feedgas emissions, in particular, during an engine cold-start.

BACKGROUND AND SUMMARY

Emission control devices such as catalytic converters achieve higher emission reduction after reaching a predetermined operating temperature, referred to as light-off temperature. During engine cold-start conditions, emission control devices may be operated at temperatures below their light-off temperature. Engine cold-start emissions released before the emission control device has reached its light-off temperature may lower vehicle exhaust quality, and contribute to a large percentage of the total exhaust emissions. Accordingly, various approaches are focused on reducing cold-start emissions.

One example approach described in U.S. Pat. No. 8,464,542 involves reducing a level of wet exhaust reaching the catalytic converter by utilizing a system to trap liquid exhaust. Therein, engine exhaust is condensed to form liquid exhaust, and the liquid exhaust is stored in a trap. After the catalyst has reached a light-off temperature, the liquid exhaust is released back from the trap into the exhaust system. However, the inventors herein have recognized potential issues with such an approach. For example, addition of a trap to the exhaust system may lead to increased design and manufacturing costs. In addition to the trap, components such as a baffle may be included in the exhaust system to condense exhaust, which may also contribute to production costs. Further, the trapped liquid exhaust may not be released completely during operation of the vehicle. As a result, liquid exhaust may accumulate in the trap over time leading to failure of the trap system. Therefore, additional sensors and connections may be required to constantly monitor the trap system, further increasing the design complexity and production cost.

In one example, some of the above issues may be at least partially addressed by a system, comprising: an exhaust passage; a restriction valve positioned upstream of an emission control device and downstream of a turbine and a wastegate in the exhaust passage opposite an oxygen sensor; and a pre-catalyst exhaust recycling passage coupled to the exhaust passage via the restriction valve to flow engine exhaust into an intake passage upstream of a compressor inlet during cold-start conditions.

As an example, during an engine cold-start, while a temperature of an emission control device, such as a catalytic converter is below a threshold temperature (e.g. light-off temperature), a restriction valve may be opened to block a portion of engine exhaust in the exhaust passage upstream of the catalytic converter. The blocked portion of exhaust may be not flow through the catalytic converter and may be diverted to a compressor inlet via a pre-catalyst exhaust recycling passage connecting the exhaust passage upstream of the catalytic converter and downstream of the turbine with the intake passage upstream of the compressor. Further, the restriction valve may not completely block an entire amount of exhaust in the exhaust passage. A remaining portion of the exhaust not blocked by the restriction valve may flow through the catalytic converter to enable heating of the catalyst. Upon the temperature of the catalytic converter reaching the threshold temperature, the restriction valve may be closed to stop recycling the exhaust via the pre-catalyst exhaust recycling passage, and the entire amount of exhaust may be allowed to flow through the catalytic converter.

In this way, the restriction valve may be utilized to reduce an amount of engine exhaust flowing through the catalytic converter when the catalyst temperature is below its light-off temperature. By reducing the amount of exhaust flowing through the catalyst, cold-start emissions may be reduced.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

FIG. 4 shows a high level flow chart illustrating a routine that may be implemented for adjusting the exhaust restriction valve in order to recycle exhaust waste.

DETAILED DESCRIPTION

Figure 1:
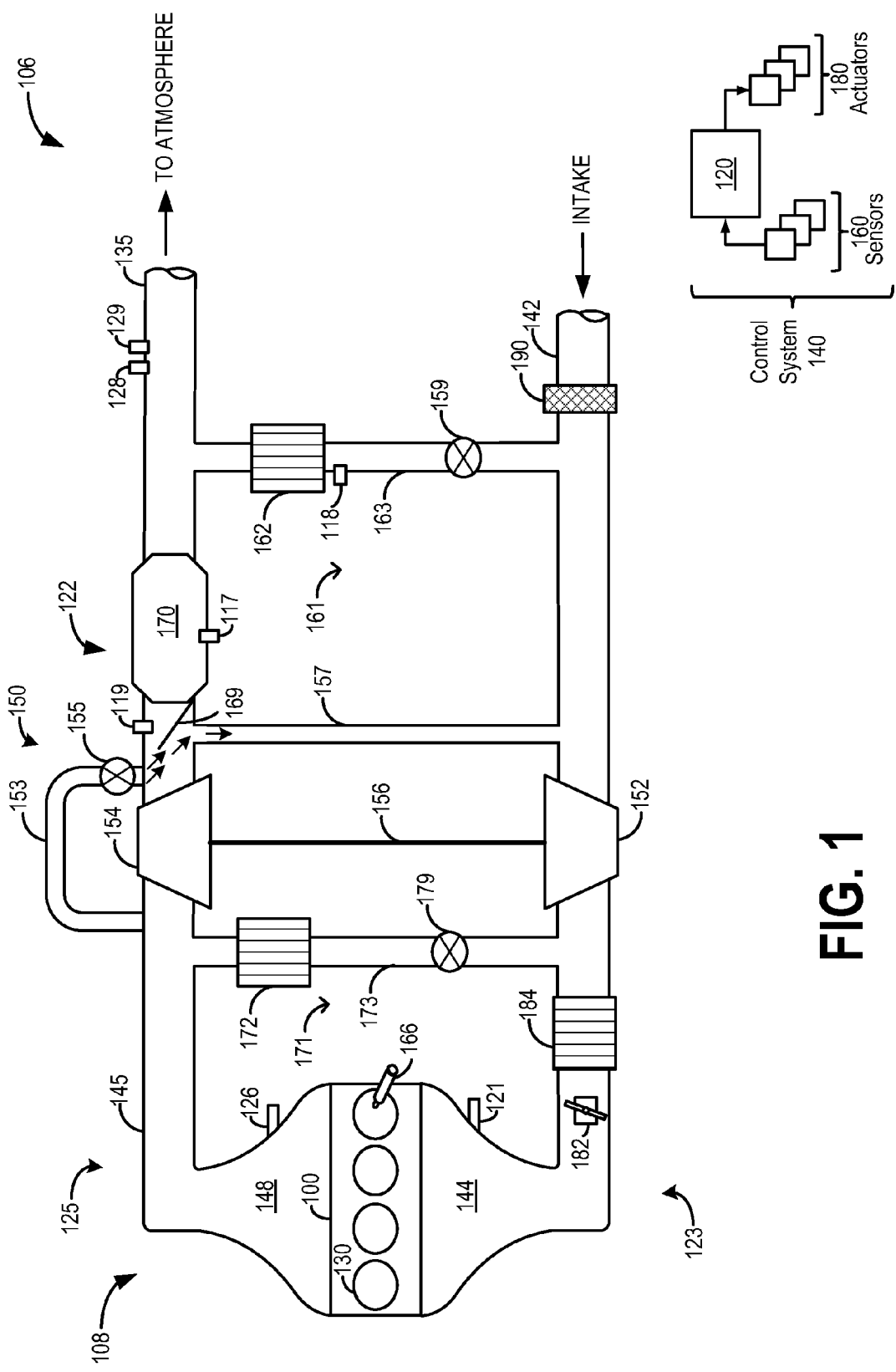
FIG. 1 shows a schematic depiction of an engine system including a cold-start exhaust recycling system and a wastegate.
Figure 5:
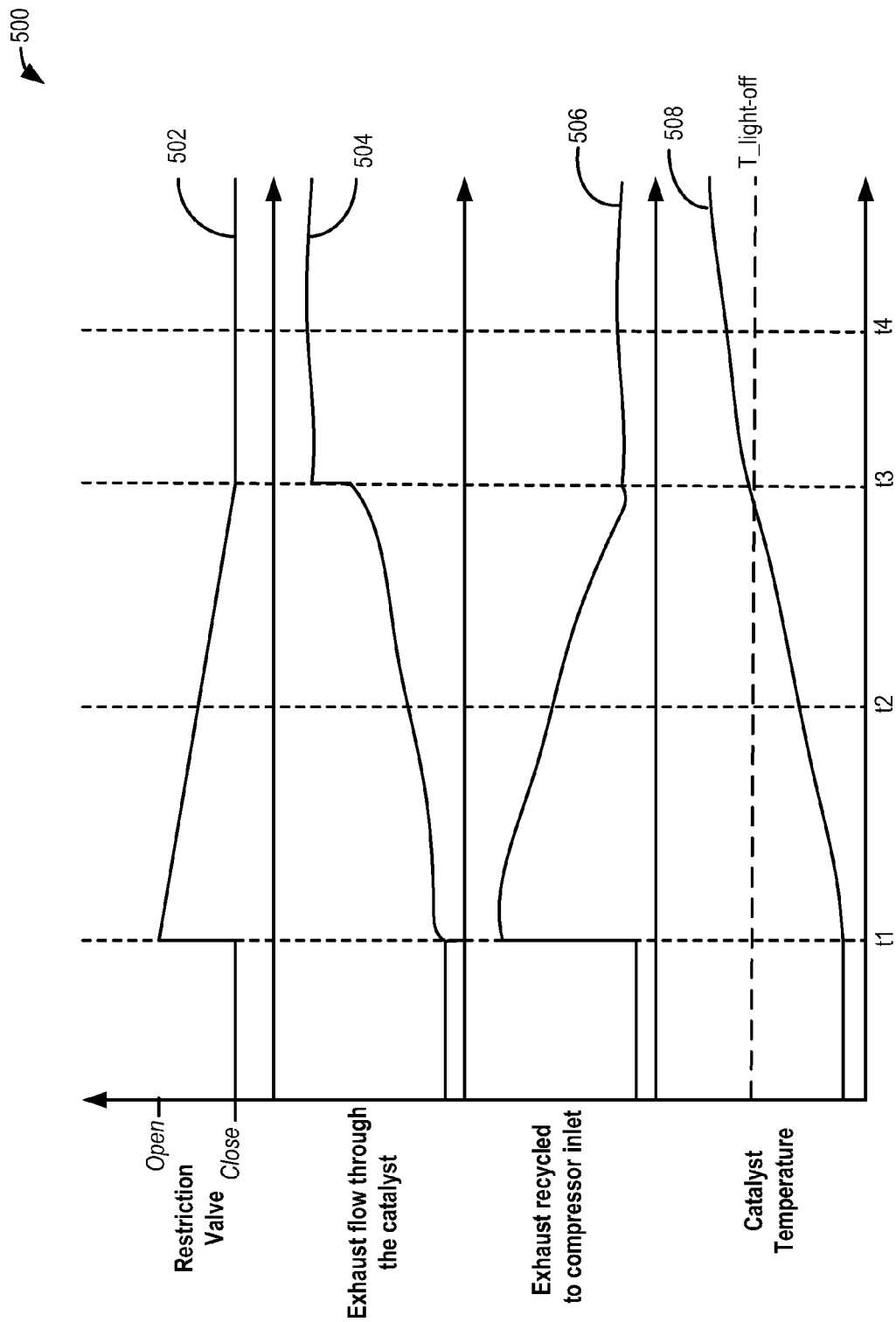
FIG. 5 shows an example exhaust restriction valve adjustment during a cold-start, according to the present disclosure.
Figure 6:
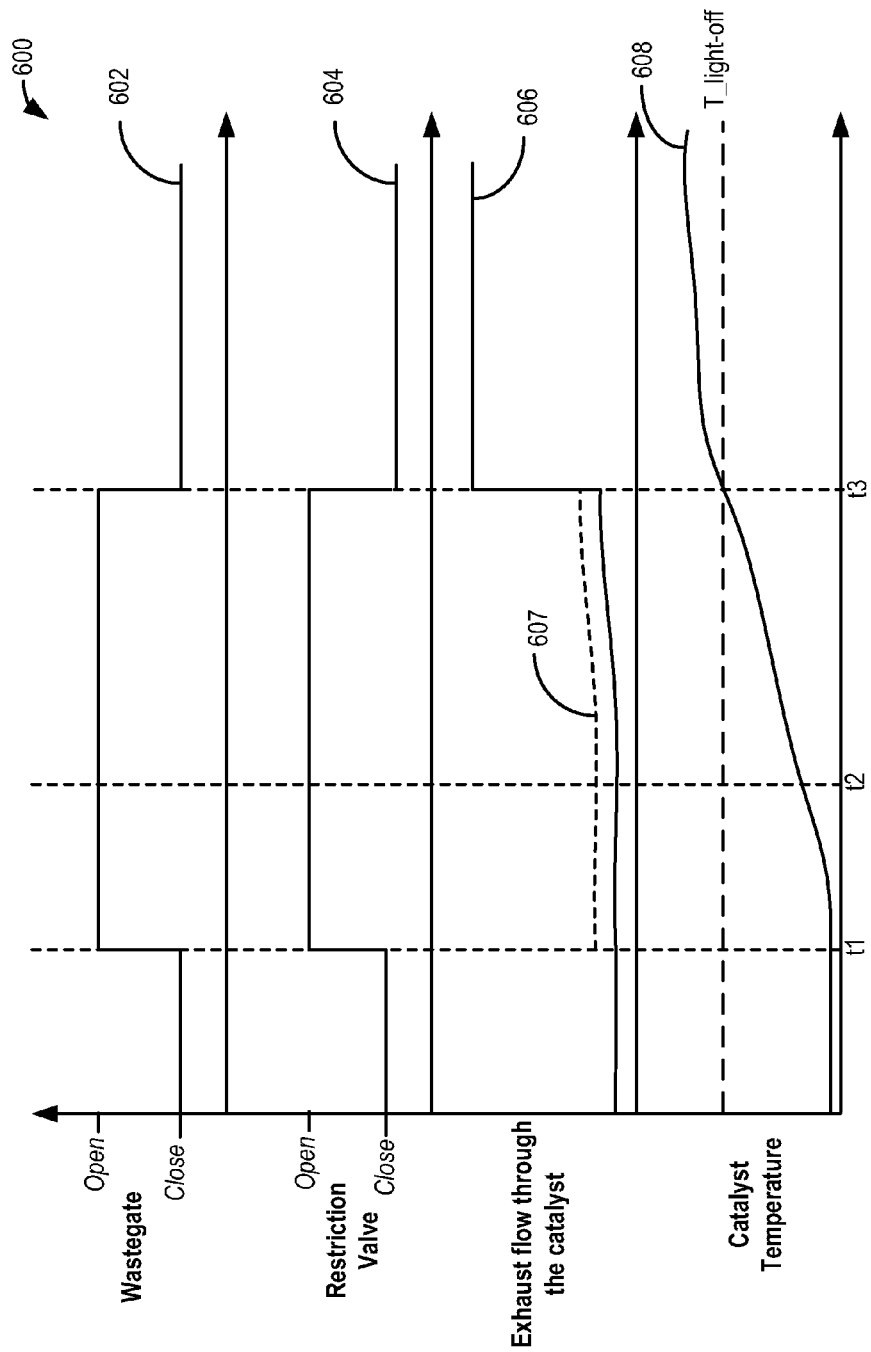
FIGS. 6 and 7 show example wastegate and exhaust restriction valve adjustments, according to the present disclosure.
Figure 7:
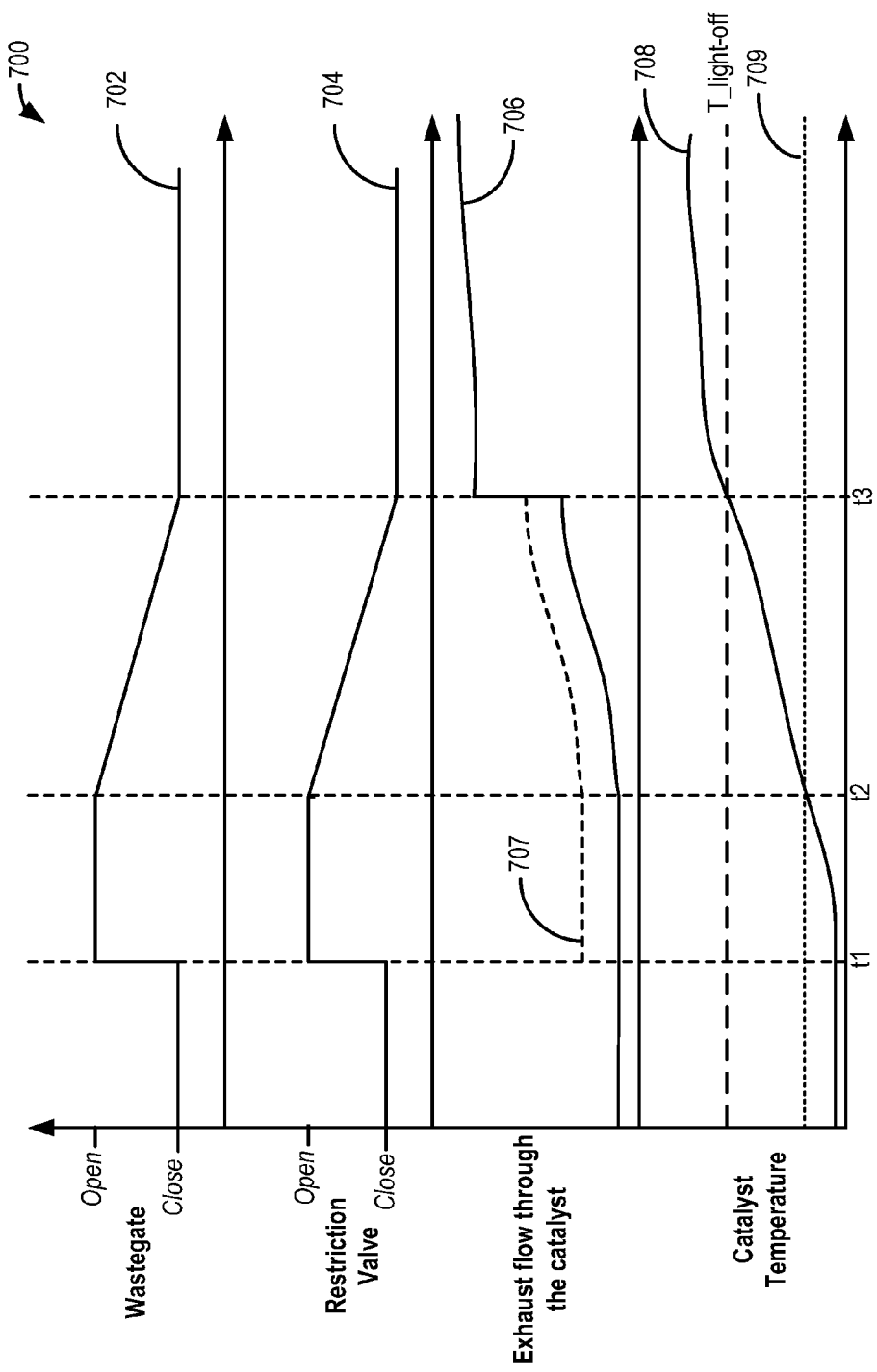
Figure 8:
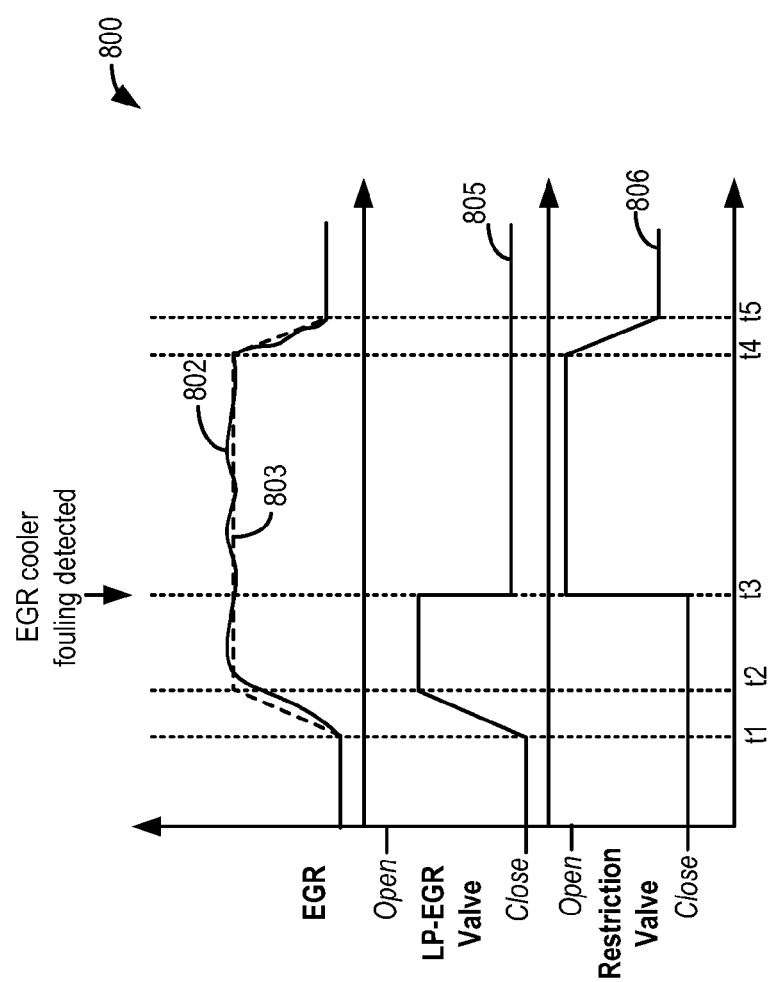
FIG. 8 shows an example exhaust restriction valve adjustment for meeting EGR needs during EGR cooler fouling conditions, according to the present disclosure.

Methods and systems are provided for reducing an amount of engine exhaust passing through the catalytic converter during an engine cold-start in a vehicle equipped with an internal combustion engine, such as the engine system of FIG. 1. An exhaust recycling system, such as the recycling system of FIG. 2, may be included in the engine exhaust system of FIG. 1 to recycle engine exhaust. The recycling system may include a restriction valve illustrated at FIGS. 3A-3C for adjusting the amount of engine exhaust flowing through the catalytic converter and diverting the exhaust to a compressor inlet. A controller may be configured to perform a control routine, such as the example routine of FIG. 4, to adjust a position of the restriction valve based on a temperature of the catalytic converter. In some examples, a wastegate as depicted at FIG. 1 may be adjusted in addition to the restriction valve adjustment to reduce exhaust flow through the catalytic converter during cold-start conditions. Example restriction valve and wastegate adjustments are shown at FIGS. 5-7. In some examples, the recycling system of FIG. 2 may be employed to recirculate exhaust gas during conditions of a low pressure exhaust gas recirculation (LP-EGR) cooler fouling. Example restriction valve and LP-EGR valve adjustments during conditions of LP-EGR cooler fouling are shown at FIG. 8.

Figure 2:
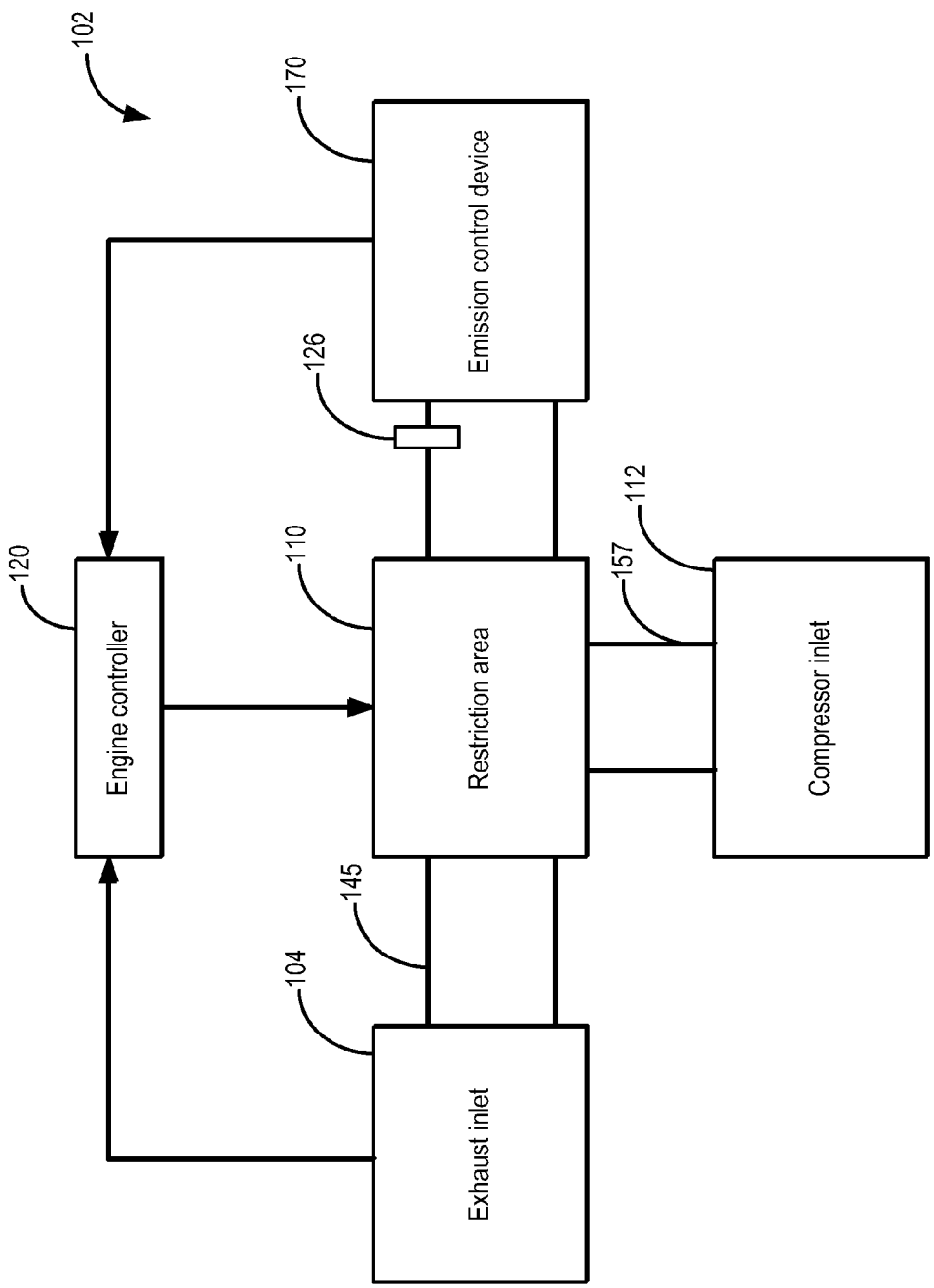
FIG. 2 shows a block diagram of a cold-start exhaust recycling system included in an exhaust system of engine system of FIG. 1.

FIG. 2 shows a schematic depiction of a vehicle system 106. The vehicle system 106 includes an engine system 108, including engine 100 coupled to emission control system 122. Engine 100 includes a plurality of cylinders 130. Engine 100 also includes an intake 123 and an exhaust 125. Intake 123 may receive fresh air from the atmosphere through intake passage 142. Air entering intake passage 142 may be filtered by air filter 190. Intake passage 142 may include an air intake throttle 182 positioned downstream of an intake compressor 152 and an intake charge air cooler 184. Intake throttle 182 may be configured to adjust the flow of intake gas (e.g., boosted intake air) entering engine intake manifold 144. Exhaust 125 includes an exhaust manifold 148 leading to an exhaust passage 145 that routes exhaust gas to the atmosphere via tailpipe 135.

Engine 100 may be a boosted engine including a boosting device, such as turbocharger 150. Turbocharger 150 may include intake compressor 152, arranged along intake passage 142, and an exhaust turbine 154, arranged along exhaust passage 145. Compressor 152 may be at least partially driven by turbine 154 via shaft 156. The amount of boost provided by the turbocharger may be varied by an engine controller. A turbine bypass valve described herein as wastegate 155 may be provided along a turbine bypass passage 153 coupled across the turbine for enabling exhaust gases to bypass turbine 154. By adjusting the position of the wastegate, an amount of exhaust gas delivered through the turbine may be varied, thereby varying an amount of boost delivered to the engine intake.

In further embodiments, a similar bypass passage controlled via a bypass valve (not shown) may be coupled across the intake compressor so that some or all of the intake air compressed by compressor 152 can be recirculated into the intake passage 142 upstream of compressor 152. By adjusting the position of the compressor bypass valve, pressure in the intake system may be released during selected conditions to reduce the effects of compressor surge loading.

An optional charge air cooler 184 may be included downstream of compressor 152 in the intake passage to reduce the temperature of intake air compressed by the turbocharger. Specifically, after-cooler 184 may be included upstream of intake throttle 182 or integrated into the intake manifold 144.

Emission control system 122, coupled to exhaust passage 145, includes a catalyst 170. Catalyst 170 may include multiple catalyst bricks, in one example. In another example, multiple emission control devices, each with multiple bricks, can be used. Catalyst 170 can be a three-way type catalyst in one example. In other examples, catalyst 170 may be an oxidation catalyst, lean NOx trap, selective catalyst reduction (SCR) device, particulate filter, or other exhaust aftertreatment device. While catalyst 170 is arranged downstream of turbine 154 in the embodiments described herein, in other embodiments, catalyst 170 may be arranged upstream of a turbocharger turbine or at another location in the engine exhaust passage without departing from the scope of this disclosure.

Vehicle system 106 further includes a low-pressure EGR (LP-EGR) system 161. LP-EGR system 161 includes an EGR passage 163 that couples exhaust passage 145, downstream of exhaust catalyst 170 and upstream of exhaust throttle 164, with air intake passage 142, upstream of compressor 152. An EGR cooler 162 arranged in EGR passage 163 cools exhaust gas flowing there-through. A position of EGR valve 159, located in EGR passage 163 on the intake passage side of EGR cooler 162, may be adjusted by controller 120 to vary an amount and/or rate of exhaust gas recirculated from the exhaust passage to the intake passage via the LP-EGR system. In some embodiments, one or more sensors may be positioned within LP-EGR passage 163 to provide an indication of one or more of a pressure, temperature, and air-fuel ratio of exhaust gas recirculated through the LP-EGR passage. For example, temperature sensor 118 may be coupled to an outlet (on the intake passage side) of EGR cooler 162 and may be configured to provide an estimate of an EGR cooler outlet temperature. Exhaust gas recirculated through LP-EGR passage 163 may be diluted with fresh intake air at a mixing point located at the junction of LP-EGR passage 163 and intake passage 142. Specifically, by adjusting a position of EGR valve 159, a dilution of the EGR flow may be adjusted.

A pre-catalyst exhaust recycling passage 157 may be provided to fluidly couple the exhaust passage at a location upstream of the catalyst 170 with the air intake passage 142. A restriction valve 169 located at a junction of the exhaust passage and the pre-catalyst recycling passage may be utilized to block the engine exhaust in the exhaust passage and divert the engine exhaust to the compressor inlet via the pre-catalyst recycling passage during cold-start conditions. The restriction valve may be located upstream of exhaust catalyst 170. Additionally, as elaborated with reference to FIG. 4, the pre-catalyst recycling passage may be utilized to deliver LP-EGR to the air intake passage during conditions of LP-EGR cooler failure.

The amount of exhaust gas diverted via the pre-catalyst recycling passage may be controlled by adjusting the restriction valve 169. In the embodiments described herein, controller 120 may control a position of restriction valve 169 based on various engine operating conditions and parameter values (e.g., engine cold-start, LP-EGR cooler failure, etc.). In other embodiments, the restriction valve may be designed such that the restriction valve is mechanically controlled as needed during various engine operating conditions, without control system intervention. As elaborated with reference to FIG. 4, restriction valve may be selectively opened by controller 120 during engine cold-start conditions to divert engine exhaust from upstream of the catalyst to the compressor inlet. By utilizing the restriction valve, amount of exhaust flowing through the catalyst prior to the catalyst reaching its light-off temperature, may be reduced.

As such, the restriction valve may be designed such that when the restriction valve is open, an area of the exhaust passage may remain unblocked in order to allow a portion of exhaust to flow through the catalytic converter. The exhaust may flow through the turbine and the turbine may shoot the engine exhaust towards the catalytic converter in the exhaust passage. The restriction valve located in the exhaust passage may block a portion of exhaust flowing from the turbine and may divert the blocked portion of exhaust to the compressor inlet. The portion of exhaust not diverted by the restriction valve may flow to the catalytic converter through the unblocked area between the restriction valve and a wall of the exhaust passage.

In some embodiments, during conditions when the restriction valve is open, wastegate 155 may be opened to direct flow of exhaust into the pre-catalyst exhaust recycling passage 157 and thereby, increase an amount of exhaust recycled through the pre-catalyst recycling passage. For example, upon opening the wastegate, the exhaust may flow through the turbine bypass passage bypassing the turbine. The exhaust exiting the turbine bypass passage through the wastegate may be released at an angle (direction of flow indicated by arrows) that facilitates flow of increased amount of exhaust through the pre-catalyst recycling passage. That is, by releasing the exhaust via the wastegate, the amount of exhaust flowing through the open area (unblocked by the restriction valve) between the restriction valve and the exhaust manifold may be reduced. Consequently, the amount of exhaust flowing through the catalytic converter may be reduced. In this way, during cold-start conditions, operations of the wastegate and the restriction valve may be coordinated to further reduce cold-start emissions. Example operations of the wastegate and the restriction valve will be further elaborated with respect to FIGS. 5, 6 and 7.

Restriction valve 169 may be maintained in a fully closed position during most engine operating conditions, but may be configured to open to recycle exhaust gases under certain conditions, as will be detailed below with reference to FIG. 4. As such, during cold-start conditions, the catalyst may be below the catalyst light-off temperature. Engine exhaust passing through the catalyst when the catalyst is below the light-off temperature, may not be sufficiently treated. As a result, vehicle exhaust quality may be reduced. By utilizing a restriction valve to control the amount of exhaust flowing through the catalyst and recycle exhaust gases to the compressor inlet until the catalyst has reached the light-off temperature, emissions may be improved.

Accumulation of soot in the EGR cooler 162 may cause EGR cooler fouling. Consequently, an amount of EGR supplied through the LP-EGR loop may be less than desired. Therefore, during LP-EGR cooler fouling conditions, EGR may be supplied through pre-catalyst exhaust recycling passage 157 by opening restriction valve 169. In one example, the pre-catalyst recycling passage may be used along with the LP-EGR loop to provide desired EGR. For example, restriction valve 169 and LP-EGR valve 159 may be adjusted to provide desired EGR amount. In another example, LP-EGR valve 159 may be closed and EGR may be provided by opening restriction valve 169.

In some embodiments (as depicted), vehicle system 106 further includes a high-pressure EGR (HP-EGR) system 171. HP-EGR system 171 includes an EGR passage 173 that couples exhaust passage 145, upstream of turbine 154 with air intake passage 142, downstream of compressor 152 and upstream of charge air cooler 184 and intake throttle 182. An EGR cooler 172 arranged in EGR passage 173 cools exhaust gas flowing there-through. A position of EGR valve 179, located in EGR passage 173 on the intake passage side of EGR cooler 172, may be adjusted by controller 120 to vary an amount and/or rate of exhaust gas recirculated from the exhaust passage to the intake passage via the HP-EGR system. In some embodiments, one or more sensors may be positioned within HP-EGR passage 173 to provide an indication of one or more of a pressure, temperature, and air-fuel ratio of exhaust gas recirculated through the HP-EGR passage.

Engine 100 may be controlled at least partially by a control system 140 including controller 120 and by input from a vehicle operator via an input device (not shown). Control system 140 is configured to receive information from a plurality of sensors 160 (various examples of which are described herein) and sending control signals to a plurality of actuators 180. As one example, sensors 160 may include exhaust gas oxygen sensor 126 coupled to exhaust manifold 148, MAP sensor 121 coupled to intake manifold 144, exhaust catalyst temperature sensor 117, exhaust pressure sensor 119 located upstream of catalyst 170 in tailpipe 135, exhaust temperature sensor 128, and exhaust pressure sensor 129 located downstream of catalyst 170 in tailpipe 135. As one example, the exhaust gas oxygen sensor may be configured as universal exhaust gas oxygen sensor (UEGO). In some embodiments, as shown with respect to FIGS. 3A-3C, the exhaust oxygen sensor may be arranged at least partly downstream of the restriction valve and upstream of the catalyst. In some other embodiments, the exhaust oxygen sensor may be arranged downstream of the turbine and upstream of the restriction valve.

Various exhaust gas sensors may also be included in exhaust passage 145 downstream of catalyst 170, such as particulate matter (PM) sensors, NOx sensors, oxygen sensors, ammonia sensors, hydrocarbon sensors, etc. Other sensors such as additional pressure, temperature, air/fuel ratio and composition sensors may be coupled to various locations in the vehicle system 106. As another example, actuators 180 may include fuel injector 166, restriction valve motor (not shown), EGR valve 159, and intake throttle 182. Other actuators, such as a variety of additional valves and throttles, may be coupled to various locations in vehicle system 106. Controller 120 may receive input data from the various sensors, process the input data, and trigger the actuators in response to the processed input data based on instruction or code programmed therein corresponding to one or more routines. An example control routine is described herein with regard to FIG. 4.

Turning to FIG. 2, it depicts an exhaust recycling system 102 for recycling exhaust waste to reduce emissions during cold-start conditions. The recycling system may be included in an exhaust passage 145 of a vehicle system, such as the vehicle system of FIG. 1. The system may be located upstream of an emission control device 170 such as a catalytic converter in order to reduce an amount of exhaust gas flowing through the catalytic converter during cold-start conditions. In some examples, the system may function as an alternate LP-EGR loop during conditions of a LP-EGR cooler failure.

System 102 may include an inlet 104, such as an exhaust inlet which may be coupled to a restriction area 110 which in turn may be coupled to emission control device 170. Inlet 104 may be located downstream of a turbine and upstream of emission control device 170. Inlet 104 may be adapted to enable passage of exhaust to the restriction area from an engine as described in regards to FIG. 1. In one example, inlet 104 may receive engine exhaust from the turbine of a turbocharger. In another example, inlet 104 may receive engine exhaust from a turbine bypass passage through a wastegate. In still another example, inlet 104 may receive engine exhaust from the turbine and from the turbine bypass passage.

The restriction area may be further coupled to a compressor inlet 112 through a pre-catalyst recycling passage 157. Passage 157 may be adapted to flow engine exhaust from the engine to the compressor inlet during cold-start conditions to reduce an amount of exhaust flowing through the emission control device before the emission control device has reached its operating temperature. In some examples, in addition to recycling engine exhaust during cold-start conditions, passage 157 may be utilized to recirculate engine exhaust from downstream of turbine to upstream of compressor during conditions of EGR cooler fouling.

An exhaust oxygen sensor 126 may be coupled to the exhaust passage at least partly downstream of the restriction area and upstream of the emission control device. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. In some examples, sensor 126 may be coupled to the exhaust passage upstream of the restriction area.

Figure 3A:
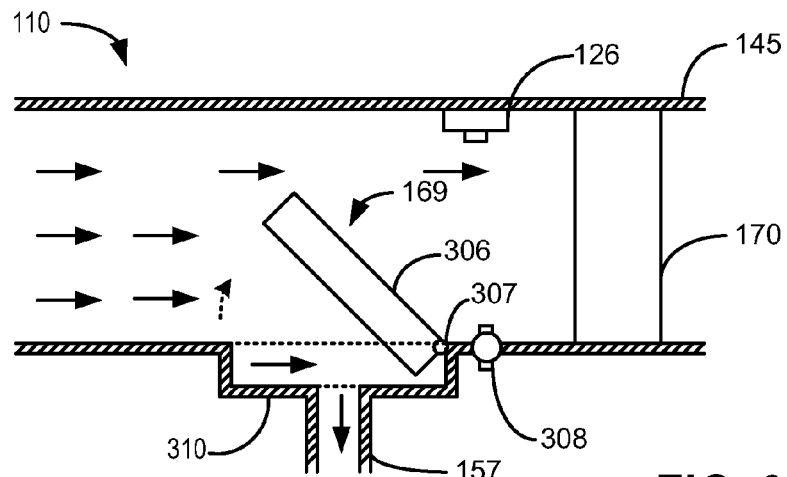
FIG. 3A shows a schematic illustration of the cold-start exhaust recycling system including an exhaust restriction valve in an open position.
Figure 3B:
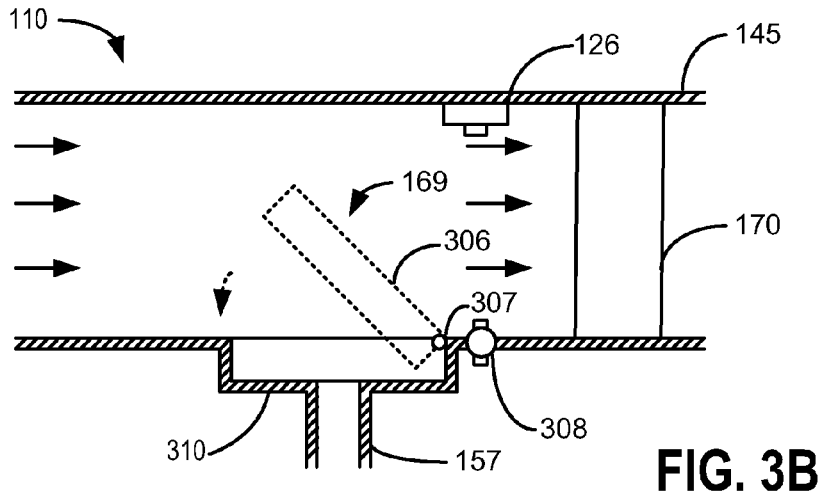
FIG. 3B shows a schematic illustration of the cold-start exhaust recycling system including the exhaust restriction valve in a closed position.
Figure 3C:
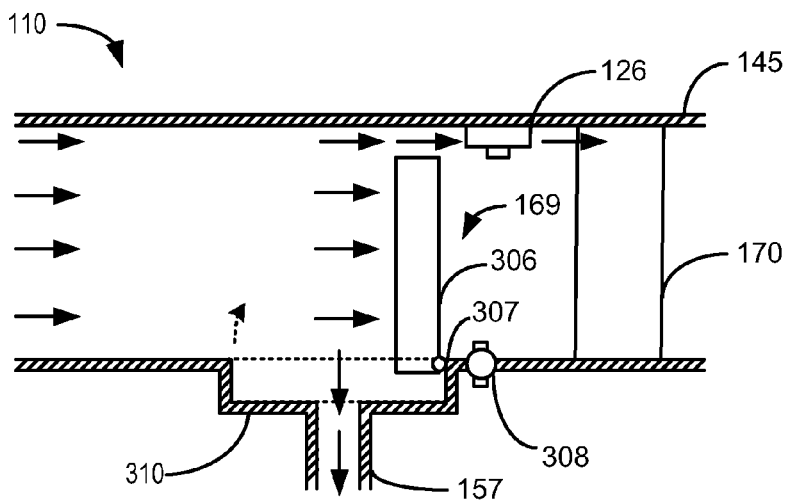
FIG. 3C shows a schematic illustration of the cold-start exhaust recycling system including the exhaust restriction valve in a position that permits maximum recycling of engine exhaust.

The restriction area may include a restriction valve elaborated at FIG. 1, and further elaborated with respect to FIGS. 3A-3C. The restriction valve may be utilized to adjust flow of engine exhaust into compressor inlet via pre-catalyst restriction passage 157. Further, an engine controller 120 may be provided to enable control of system 102. For example, the controller may receive information regarding a temperature of the emission control device and may adjust a position of the restriction valve based on the information received.

In this way, the exhaust recycling system 102 of FIG. 2 may be utilized to block and recycle engine exhaust flowing from the turbine and/or the turbine bypass, thereby educing an amount of engine exhaust flowing into the catalytic converter during cold-start conditions.

FIGS. 3A, 3B, and 3C show schematic illustrations of a restriction area 110 included in an exhaust recycling system 102, such as the recycling system of FIG. 2 for recycling a portion of engine exhaust from a location upstream of a catalytic converter to a compressor inlet during cold-start conditions. Specifically, FIG. 3A, shows a restriction valve 169 of the exhaust recycling system in an open position. The restriction valve may be utilized to regulate the amount of exhaust recycled. FIG. 3B shows restriction valve 169 in a closed position, and FIG. 3C shows restriction valve 169 in a position that may allow maximum blockage of the engine exhaust. By recycling engine exhaust, an amount of exhaust reaching the catalytic converter before the catalyst has reached its light off temperature may be reduced.

The restriction valve may be located in an exhaust passage 145 of the engine system of FIG. 1 upstream of the exhaust catalytic converter 170 and exhaust gas sensor 126, and downstream of an exhaust turbine and a wastegate. Specifically, the restriction valve may be located at a junction where a pre-catalyst exhaust recycling passage 157 is coupled to the exhaust passage. The restriction valve may regulate the flow of exhaust gases into the pre-catalyst exhaust recycling passage.

The restriction valve may include a plate 306 and the plate may be attached to a wall of exhaust passage 145 via a hinge 307. The hinge may be downstream of a leading edge of the plate. That is, the hinge may be on a downstream side of the valve. The plate may be pivoted to open and close about an axis of the hinge. In other words, the plate may rotate about the axis of the hinge. In one example, the plate may rotate up to 90 degrees about the hinge axis. In another example, the plate may rotate up to 180 degrees about the hinge axis. When the restriction valve is in an open position, the plate of the restriction valve may be in a path of exhaust flow (indicated by solid arrows) and may block an amount of engine exhaust in the exhaust passage, and divert the blocked engine exhaust into pre-catalyst exhaust recycling passage 157. The plate may be a built-in metal piece attached to exhaust passage via the hinge. Further, the plate may be shaped such that when the valve is in a closed position (as shown at FIG. 3B), the plate is concentric to a portion of the exhaust passage, and there is no major flow disturbance due to the restriction valve to the flow of exhaust gases through the exhaust passage.

In one example, the exhaust passage may include a modified wall 310 as shown at FIGS. 3A-3C to accommodate the plate of the restriction valve such that when the restriction valve is closed, a plane of the restriction valve is in level with a plane of the exhaust passage and there may be no resistance to the flow of exhaust gases through the exhaust passage.

The restriction valve may be actuated by a motor actuator 308. The motor actuator may be an electric motor actuator, for example. The motor actuator may communicate with the controller to adjust a position of the restriction valve.

In an open position, as shown at FIG. 3A, the restriction valve may block a portion of the exhaust from reaching the catalyst and allow a remaining portion of exhaust to pass through the catalyst. The portion of the exhaust that is blocked from reaching the catalyst may flow through passage 157 to the inlet of the compressor. The remaining amount of exhaust (that is, the exhaust not flowing through the passage to the compressor inlet) may flow through the catalytic converter and subsequently, vented into the atmosphere.

The amount of exhaust flowing through the passage to the compressor inlet may be regulated by adjusting a position of the restriction valve. The position of the restriction valve may be adjusted by adjusting an angle between a plane of the restriction plate of the restriction valve and a perpendicular axis of the hinge of the restriction valve. For example, until a threshold angle is reached, as an angle between a plane of the plate and a perpendicular axis of the hinge increases, the amount of exhaust flowing through the passage to the compressor inlet may increase. In one example, as shown at FIG. 3C, the restriction valve may block a maximum amount of exhaust when an angle between a plane of the plate and a perpendicular axis of the hinge is 90 degrees. That is, the threshold angle may be 90 degrees. However, even when fully open, there is still an area between the end of the plate and the inner wall of the exhaust passage such that some flow passes to the emission catalyst and tailpipe and then to ambient. Further, in any open position, the restriction valve may not block all of the exhaust from reaching the catalyst. That is, in any open position, the restriction valve may allow a portion of exhaust to flow through the exhaust gas sensor and the catalytic converter so as to enable heating of the exhaust gas sensor and the catalytic converter.

When the restriction valve is in a closed position, as shown at FIG. 3B, the plate of the restriction valve may be flush with an inner surface of the exhaust passage that is exposed to the exhaust gases. That is, the angle between a plane of the plate and a perpendicular axis of the hinge may be zero. Further, when the restriction valve is closed, passage 157 may be isolated from the exhaust passage and consequently, no exhaust may flow through the passage and all of the exhaust may flow through the catalytic converter without any resistance from the restriction valve.

In one example, during cold-start conditions, the controller may open the restriction valve to allow a first amount of exhaust gas to flow through the passage and into the compressor inlet, and a second amount of exhaust (the second amount may be an amount of exhaust that is not flowing through the passage to compressor inlet) may flow through the catalytic converter. The first amount and the second amount may be based on the opening of the restriction valve. The opening of the restriction valve may be based on a temperature of the catalytic converter. Additionally, the exhaust gas sensor may be exposed to the second amount of exhaust. Upon the catalytic converter reaching a catalyst light-off temperature, the controller may close the restriction valve to allow all of the exhaust entering the exhaust passage downstream of the exhaust turbine and wastegate to flow through the catalytic converter.

In another example, a system may comprise an exhaust passage; a restriction valve positioned upstream of an emission control device and downstream of a turbine and a wastegate in the exhaust passage opposite an oxygen sensor; and a pre-catalyst exhaust recycling passage coupled to the exhaust passage via the restriction valve to flow engine exhaust into an intake passage upstream of a compressor inlet during cold-start conditions. The oxygen sensor may be located in the exhaust passage at least partially downstream of the restriction valve and upstream of the emission control device. The restriction valve may include a restriction plate and a hinge, the restriction plate rotating about an axis of the hinge, the hinge downstream of a leading edge of the plate, the plate flush with an inside wall of the exhaust passage when in the closed position. The restriction plate may comprise a metal. Further, the restriction plate may include an open configuration, the open configuration of the restriction plate blocking a first amount of engine exhaust and diverting the first amount of engine exhaust into the recycling passage. The restriction plate in the open configuration may allow a second amount of engine exhaust to flow through the emission control device. Still further, the restriction plate may include a closed configuration, the closed configuration of the restriction plate may allow all of the engine exhaust to flow through the emission control device. In one example, the restriction plate may rotate up to 90 degrees about the axis of the hinge. In another example, the restriction plate may rotate up to 180 degrees about the axis of the hinge. The system may further comprise a controller with computer readable instructions for: determining a temperature of the emission control device; and determining an opening of the restriction valve based on the temperature of the emission control device to flow an amount of engine exhaust into the recycling passage.

In this way, the restriction valve may be utilized to recycle a portion of exhaust gas into the compressor inlet during cold-start conditions. By reducing the amount of exhaust reaching the catalytic converter before the catalyst has reached it catalyst light-off temperature, cold-start emissions may be reduced.

Turning to FIG. 4, routine 400 depicts a method for adjusting the position of a restriction valve (such as the restriction valve illustrated at FIGS. 1, 3A, 3B, and 3C) during an engine cold-start to reduce an amount of exhaust reaching the catalytic converter before the catalyst has reached its operating temperature.

At 402, the routine includes confirming an engine cold-start. For example, it may be determined if an engine temperature (e.g., as inferred from an engine coolant temperature) is below a threshold. Upon confirming an engine cold-start, at 404, it may be determined if a temperature of the exhaust catalyst (T_cat) is below a catalyst light-off temperature (T_light-off). In other words, it may be determined if the temperature of the exhaust catalyst is below its operating temperature. If yes, the routine may proceed to 406.

At 406, the controller may adjust the restriction valve to divert a portion of engine exhaust from an upstream region of the exhaust passage to the compressor inlet until the catalyst has reached the light-off temperature. For example, the controller may adjust a position of the restriction valve based on the catalyst temperature. That is, during conditions when the catalyst temperature is below the catalyst light-off temperature, a position of the restriction valve defined by an angle between a plane of a plate (e.g. plate 306 at FIGS. 3A, 3B, and 3C) of the restriction valve and a perpendicular axis of a hinge (e.g. hinge 307 at FIGS. 3A, 3B, and 3C) may be a function of catalyst temperature. For example, during conditions when the catalyst temperature is below the catalyst light-off temperature, the controller may adjust the restriction valve such that as the catalyst temperature increases, the angle between the a plane of the plate and a perpendicular axis of the hinge may decrease.

Further, at 406, in some examples, in addition to adjusting the restriction valve, the controller may adjust an opening of a wastegate to further increase an amount of exhaust recycled during cold-start conditions. Due to the direction of flow of exhaust from the turbine bypass passage into the exhaust passage via the wastegate (as shown at FIG. 1, for example), an amount of exhaust blocked by the restriction valve and diverted into the pre-catalyst exhaust recycling passage may increase as the opening of the wastegate increases. Further, during conditions when the temperature of the catalytic converter is below the catalyst light-off temperature, as the temperature of the catalytic converter increases, the controller may adjust a position of the wastegate such that the opening of the wastegate may decrease concurrently with the decreasing of the angle of the restriction plate of the restriction valve.

Returning to 404, if the catalyst temperature is greater than the catalyst light-off temperature, the routine may proceed to 410. At 410, the controller may determine if a LP-EGR cooler fouling is detected. For example, EGR cooler fouling may be determined based on a change in differential pressure across an EGR cooler greater than a threshold pressure change. As such, accumulation of soot in the EGR cooler may cause EGR cooler fouling. Consequently, efficiency of EGR cooling may decrease resulting in degraded fuel economy and increased emissions.

If LP-EGR cooler fouling is determined at 410, the routine may proceed to 412. At 412, controller may close the LP-EGR valve. Next, at 414, the controller may adjust a position of the restriction valve to utilize the passage (such as exhaust recycling passage 157 at FIG. 1) connecting the exhaust passage at a location upstream of the catalyst and downstream of the turbine to the compressor inlet, as an alternate EGR passage. Further, at 414, the wastegate may be adjusted based on engine operating conditions. That is, during conditions of EGR fouling, when the temperature of the catalyst is above the catalyst light-off temperature, wastegate may be adjusted based on engine operating conditions. Engine operating conditions may include engine coolant temperature, engine oil temperature, mass airflow (MAF), manifold pressure (MAP), boost (for example, from a boost pressure sensor), throttle inlet pressure (TIP), engine speed, idle speed, barometric pressure, a driver-demanded torque (for example, from a pedal position sensor), air temperature, vehicle speed, etc.

When the wastegate is closed (the closure determined based on engine operating conditions), the position of the restriction valve may be based on an amount of EGR requested alone. For example, as the amount of EGR request increases, the angle between a plane of the plate (e.g. plate 306 at FIGS. 3A, 3B, and 3C) and a perpendicular axis of the hinge (e.g. hinge 307 at FIGS. 3A, 3B, and 3C) of the restriction valve may increase to allow more exhaust gas to be recirculated through the passage. When the wastegate is open, the position of the restriction valve may be based on the amount of EGR requested and the opening of the wastegate.

Returning to 410, if EGR cooler fouling is not detected, the routine may proceed to 416. At 416, the controller may adjust the restriction valve such that all of the exhaust downstream of the turbine and wastegate is allowed to pass through the catalyst. For example, the controller may signal the motor actuator to close the passage connecting the exhaust passage upstream of the catalyst to compressor inlet. That is, the controller may adjust a position of the restriction valve to a close position (as shown at FIG. 3B, for example). Further, at 416, the wastegate may be adjusted based on engine operating conditions. As discussed above, engine operating conditions may include engine coolant temperature, engine oil temperature, mass airflow (MAF), manifold pressure (MAP), boost (for example, from a boost pressure sensor), throttle inlet pressure (TIP), engine speed, idle speed, barometric pressure, a driver-demanded torque (for example, from a pedal position sensor), air temperature, vehicle speed, etc.

Returning to 402, if the engine is not operating in cold-start conditions, the routine may proceed to 410. From 410, the routine may proceed as discussed above.

Taken together, during cold-start conditions when the catalyst temperature is below the light-off temperature, the restriction valve may be adjusted to divert engine exhaust from the exhaust passage upstream of the catalytic converter to the compressor inlet. In this way, the restriction valve may be utilized to reduce cold-start emissions. Further, during conditions when the catalyst temperature is above the light-off temperature, the restriction valve, and the pre-catalyst exhaust recycling passage may be utilized to flow EGR when LP-EGR cooler fouling is detected.

In one example, a method for a turbocharged engine may comprise: during a cold-start operation when a temperature of an exhaust catalyst is below a threshold, opening a restriction valve located upstream of the exhaust catalyst and downstream of a turbine to flow a first amount of engine exhaust into an exhaust recycling passage while flowing a second amount of engine exhaust through the exhaust catalyst, the first amount and the second amount adjusted based on the temperature. The recycling passage may couple an exhaust passage with an intake passage upstream of a compressor. Further, a wastegate may be opened to increase the first amount of exhaust by a third amount while flowing the first and second amounts. Opening the restriction valve may comprise adjusting an angle between a plane of a restriction plate of the restriction valve and a perpendicular axis of a hinge of the restriction valve, the hinge on a downstream side of the valve. The angle between a plane of the restriction plate of the restriction valve and the perpendicular axis of the hinge of the restriction valve may decrease as the temperature of the exhaust catalyst increases. Further, an opening of the wastegate may decrease as the temperature of the exhaust catalyst increases concurrently with the decreasing of the angle of the restriction plate of the restriction valve. When the temperature of the exhaust catalyst is at or greater than the threshold temperature, the restriction valve may be closed and the wastegate may be operated based on one or more engine operating conditions.

Adjustment of restriction valve during cold-start conditions is now shown with reference to the example of FIG. 5. Specifically, map 500 shows restriction valve position at graph 502, amount of exhaust flowing through the catalyst at graph 504, amount of exhaust diverted to the compressor inlet at graph 506, and an exhaust catalyst temperature at graph 508. All graphs are plotted against time (along the x-axis).

Prior to t1, the engine may not be operating. At t1, the engine may be started. In particular, in response to the exhaust catalyst temperature (508) being below a threshold temperature (T_light-off), an engine cold-start may be initiated at t1. During the cold-start, due to the catalyst temperature being below the threshold temperature, engine may be operated with the restriction valve (502) open so as to divert an amount of exhaust to the compressor inlet. The amount of exhaust diverted may be based on the catalyst temperature.

At cold-start, that is, at t1, the restriction valve may be adjusted such that a maximum amount of exhaust may be blocked from flowing through the catalyst and recycled to the compressor inlet. However, as discussed above at FIGS. 3A-3C, even when the restriction valve is adjusted to a position to allow a maximum amount of exhaust to be recycled, the restriction valve may not block all of the exhaust. Consequently, at t1, a portion of the exhaust may flow through an exhaust gas sensor (e.g. sensor 126 at FIGS. 1-3C) and an exhaust catalyst (e.g. catalyst 170 at FIGS. 1-3C) in order to enable heating of the sensor and the catalyst.

Between t1 and t2, at t2, and between t2 and t3, engine operation may continue and catalyst temperature may increase (508). As the catalyst temperature increases, the restriction valve may be adjusted to decrease the amount of exhaust recycled to the compressor inlet. Therefore, as the catalyst temperature increases, the controller may adjust the restriction valve (502) to decrease the amount of exhaust recycled to the compressor inlet (506). However, the catalyst temperature (508) may continue to be below the threshold temperature (T_light-off).

At t3, the catalyst temperature (508) may reach the threshold temperature (T_light-off). That is the catalyst may reach its optimal operating temperature. Upon the catalyst reaching its optimal operating temperature, the controller may close the restriction valve (502) to stop recycling the exhaust into the compressor inlet and all of the exhaust may flow through the catalytic converter.

In this way, the restriction valve may be adjusted based on the catalyst temperature to reduce an amount of exhaust flowing through the catalytic converter during cold-start conditions. By reducing exhaust flow through the catalyst until the catalyst reaches the light-off temperature, cold-start emissions may be reduced.

Turning to FIG. 6, example adjustment of wastegate and restriction valve in response to catalyst temperature is shown. Specifically, map 600 depicts a wastegate position at graph 602, a restriction valve position at 604, exhaust flow through the exhaust catalyst at 606, exhaust flow through the catalyst when wastegate is not adjusted at graph 607, and an exhaust catalyst temperature at graph 608. All graphs are plotted against time (along the x-axis).

Prior to t1, engine may not be operating. At t1, engine may be started under cold-start operating conditions. In particular, when the engine is started, the exhaust catalyst temperature may be below the threshold temperature (T_light-off). At t1, the restriction valve may be opened (602) to block an amount of exhaust from flowing to the catalyst and to divert the amount of exhaust to the compressor inlet. Further, the wastegate may be opened at t1 to further increase an amount of exhaust flowing into the passage to the compressor inlet. When the wastegate is opened, the engine exhaust may by-pass the turbine and may be released into the exhaust passage downstream of the turbine. The direction of exhaust release through the wastegate may be such that an increased amount of exhaust may be blocked and diverted to the compressor inlet compared to the condition when wastegate is not opened. Consequently, a decreased amount of exhaust may flow through the exhaust catalyst when the wastegate is opened (plot 608) compared to the condition when wastegate is not opened. Plot 607 depicts exhaust flow through the catalyst when wastegate is not opened. The wastegate and the restriction valve may remain opened until the catalyst temperature (plot 608) reaches the threshold (T_light-off). That is, between t1 and t2, at t2, between t2 and t3, the wastegate and the restriction valve may be opened such that a maximum amount of exhaust may be recycled through the compressor inlet.

At t3, the catalyst may reach its light-off temperature. Upon the catalyst reaching its light-off temperature, the controller may close the wastegate and the restriction valve. In the example depicted herein at FIG. 6, the wastegate (602) is adjusted to be either completely open (e.g. between t1 and t3) or completely closed (e.g. beyond t3), and the restriction valve (plot 604) is adjusted such that the valve may either block and divert a maximum amount of engine exhaust (e.g. between t1 and t3) or allow all of the engine exhaust reaching the restriction area to pass through the catalytic converter (e.g. beyond t3).

In another example, shown at FIG. 7, the position of the wastegate and the restriction valve may be adjusted to vary based on catalyst temperature. Specifically, map 700 depicts a wastegate position at graph 702, a restriction valve position at 704, exhaust flow through the exhaust catalyst at 706, exhaust flow through the catalyst when wastegate is not adjusted at graph 707, and an exhaust catalyst temperature at graph 708. All graphs are plotted against time (along the x-axis).

Prior to t1, the engine may not be operating. At t1, the engine may be operated under cold-start conditions, and the exhaust catalyst temperature may be below a first threshold temperature 709 less than the catalyst light-off temperature (T_light-off). As a result, an amount of the engine exhaust may be recycled from an exhaust passage to a compressor inlet via a pre-catalyst exhaust recycling passage by opening the restriction valve (plot 704) to reduce an amount of cold-start engine exhaust flowing through the exhaust catalyst before the catalyst has reached its light-off temperature. Further, at t1, wastegate may be opened to increase the amount of engine exhaust recycled via the pre-catalyst recycling passage. Upon opening the wastegate exhaust may flow through a turbine by-pass passage from upstream of the turbine and may be released in to the exhaust passage downstream of the turbine and upstream of the restriction valve thereby bypassing the turbine. The exhaust flowing through the wastegate may be released in the exhaust passage such that an amount of the exhaust blocked by the restriction valve may be increased and diverted to the compressor inlet. For example, for a given open restriction valve position, amount of exhaust blocked and diverted to the compressor inlet from upstream of the catalyst by the restriction valve may be greater when the wastegate is open compared to the amount of exhaust blocked by the restriction valve when the wastegate is not open. The increased blockage of engine exhaust by the restriction valve when the wastegate is open may be due to the direction of flow of exhaust from the turbine bypass. In other words, at any given open restriction valve position, an amount of engine exhaust flowing through the catalyst may be lesser when the wastegate is open (706) than the amount of engine exhaust flowing through the catalyst when the wastegate is not open (plot 707).

At t2, the catalyst temperature may reach the first temperature threshold. Upon the catalyst temperature reaching the first threshold, the wastegate may be adjusted to a less open position thereby allowing a portion exhaust to flow through the turbine. Further, the restriction valve may also be adjusted to a less open position. Accordingly, exhaust flowing through the catalyst may gradually increase. However, as discussed above, when the catalyst temperature is less than the light-off temperature, the amount of exhaust flowing through the catalyst when the wastegate and the restriction valve are open (plot 706) may be less than the amount of exhaust flowing through the catalyst when the wastegate is closed and the restriction valve is open (plot 707).

Adjustment of the position of the wastegate and the restriction valve may be based on the catalyst temperature. For example, while the catalyst is below the light-off temperature, as the catalyst temperature increases, an opening of the wastegate may decrease and an opening of the restriction valve may decrease. Consequently, as the catalyst temperature increases, the amount of exhaust recycled from upstream of the catalyst to the compressor inlet may decrease. In other words, during cold-start conditions, as the catalyst temperature (plot 708) approaches its light-off temperature (T_light-off), the wastegate and the restriction valve (plots 702 and 704, respectively) may be adjusted such that the amount of exhaust flowing through the catalyst (plot 706) may increase.

At t3, the catalyst may reach its light-off temperature. Consequently, the restriction valve may close. Wastegate may be operated based on engine operating conditions. Engine operating conditions may include engine coolant temperature, engine oil temperature, mass airflow (MAF), manifold pressure (MAP), boost (for example, from a boost pressure sensor), throttle inlet pressure (TIP), engine speed, idle speed, barometric pressure, a driver-demanded torque (for example, from a pedal position sensor), air temperature, vehicle speed, etc. In this example, wastegate may be operated to close and the entire amount of exhaust may flow through the turbine and subsequently flow through the catalyst. In some other example, wastegate may be adjusted such that a portion of exhaust may flow through the turbine bypass to control the speed of turbine to a desired speed.

In this way, the restriction valve and the wastegate position may be coordinately controlled to reduce flow of engine exhaust through the catalytic converter during cold-start conditions until the catalytic converter has reached its operating temperature. Consequently, cold-start emissions may be reduced.

Adjustment of restriction valve position to provide EGR during conditions of EGR cooler fouling is now shown with reference to the example of FIG. 8. Specifically map 800 depicts desired EGR flow at plot 803, determined EGR flow provided by adjusting a restriction valve at plot 802, EGR valve adjustment during EGR cooler fouling conditions at plot 804, EGR valve adjustment when EGR cooler is not fouled at plot 805, and restriction valve adjustment to provide the desired EGR at plot 806.

Prior to t1, the engine may be operating with no EGR requested. Accordingly, the engine may be operated with the EGR valve closed (804).

At t1, an engine EGR requirement may increase (dotted line 803). In particular, an amount of EGR may be requested so as to provide engine dilution. To provide the desired engine dilution, the EGR valve may be shifted to a more open position (805), where the more open position is based on engine operating conditions. By opening the EGR valve, a desired amount of exhaust gas can be recirculated to the engine intake (solid line 802). As elaborated with reference to FIG. 2, the EGR valve may be included in an EGR passage, or EGR take-off, coupling the engine exhaust, upstream of the throttle, to the engine intake. Further, the EGR passage may include an EGR cooler coupled downstream of a juncture of the EGR passage and the engine exhaust and upstream of the EGR valve. Thus, when recirculating, the desired amount of catalyst-treated exhaust gas may be diverted from upstream of the exhaust throttle into the EGR passage where it may flow through the EGR cooler and then through the (open) EGR valve before being recirculated into the engine intake, upstream of an intake compressor.

At t1 the engine may not be operating at cold-start conditions, and EGR cooler fouling may not be determined. Therefore, at t1, the restriction valve may be closed. As elaborated with reference to FIGS. 1, 3A, 3B, and 3C, restriction valve (such as the restriction valve depicted at 169 at FIG. 1, for example) may be included in an exhaust passage. By adjusting an opening of the restriction valve, untreated engine exhaust may be recycled from the exhaust passage to a compressor intake via a pre-catalyst restriction passage (such as the pre-catalyst exhaust recycling passage depicted at 157 at FIG. 2, for example). The pre-catalyst recycling passage may be utilized during cold-start conditions to reduce an amount of engine exhaust flowing through the catalyst before the catalyst has reached its light-off temperature. Additionally, the pre-catalyst recycling passage may be utilized during conditions of EGR cooler fouling as an alternate passage for flowing EGR.

Next, at t2, and between t2 and t3, the EGR valve may be adjusted based on engine operating conditions to provide the desired EGR and the restriction valve may remain closed. At t3, the controller may determine LP-EGR cooler fouling. Exhaust gas may contain soot, which may accumulate in the EGR cooler over a period of time. The accumulation of soot in the EGR cooler may cause EGR cooler fouling. Due to accumulation of soot in the EGR cooler, there may be increased pressure drop across the EGR cooler. Consequently, the amount of EGR supplied through the EGP loop (that is, via EGR passage including the EGR cooler and the EGR valve) may be less than desired. Therefore, upon determination of EGR cooler fouling at t3, LP-EGR valve may be closed (plot 805) and EGR may be provided by recirculating a desired amount of exhaust gas through the pre-catalyst exhaust recycling passage. To provide the desired engine dilution, the restriction valve may be adjusted to an open position (plot 806), where the adjustment is based on an amount of EGR requested. The amount of EGR requested may be based on engine operating conditions. In some examples, when a wastegate is open, the position of the restriction valve may be adjusted based on wastegate position and the amount of EGR requested. By opening the restriction valve, a desired amount of exhaust gas can be recirculated to the engine intake (solid line 802).

At t3, and between t3 and t4, EGR requirement may remain constant. Consequently, the restriction valve position may remain at the open position adjusted at t3 to provide desired EGR while LP-EGR valve remains closed (plot 805). Further, at t4 and beyond, EGR requirement may change and based on the change in EGR requirement, the restriction valve may be adjusted to provide the desired EGR. For example, between t4 and t5, EGR requirement may decrease (plot 802), and consequently the restriction valve position may be adjusted such that the restriction valve is less open.

While in the example illustrated at FIG. 8, EGR valve is closed upon determination of EGR cooler fouling and EGR is provided entirely through the pre-catalyst recycling passage, in some examples, the EGR valve and the restriction valve may be coordinately adjusted to provide a desired amount of EGR. For example, with the restriction valve closed, the controller may determine a difference between an EGR amount supplied through the LP-EGR loop and a desired EGR amount. Based on the difference, the controller may then adjust the restriction valve to provide a desired EGR amount.

In this way, during conditions of a LP-EGR cooler fouling, the restriction valve may be utilized to divert a portion of exhaust to the intake passage.

Taken together, a restriction valve disposed in an exhaust passage, and a pre-catalyst exhaust recycling passage may be utilized to reduce an amount of engine exhaust flowing through a catalytic converter during cold-start conditions. By reducing the exhaust flowing through the catalytic converter when a temperature of the catalytic converter is below its operating temperature, cold-start emissions may be reduced.

In one example a system may comprise an exhaust passage having a restriction valve controlling a first amount of untreated exhaust flowing into a compressor inlet via a passage coupling the exhaust passage upstream of an exhaust catalyst and the compressor inlet, the restriction valve rotating about a hinge on a completely downstream end of the valve. The system may further comprise a controller with non-transitory instructions stored in memory, including instructions for adjusting an opening of the restriction valve based on a temperature of the exhaust catalyst to divert the first amount of engine exhaust to the compressor inlet when the temperature of the exhaust catalyst is below a threshold temperature. Further, the controller may include instructions for closing a low pressure exhaust gas recirculation valve, and adjusting the opening of the restriction valve based on a desired EGR amount to divert a second amount of engine exhaust to the compressor inlet when the temperature of the exhaust catalyst is above a threshold temperature and when fouling of a low pressure exhaust gas recirculation cooler is detected.

In another representation, as described above, an example method for a turbocharged engine includes determining that the engine is operating in a cold-start warm-up from ambient temperatures responsive to a temperature of an exhaust catalyst being below a threshold. During such determined operation, the method may also include, opening a restriction valve located upstream of the exhaust catalyst and downstream of a turbine, via an electronic controller including non-transitory instructions stored in memory, to flow a first amount of engine exhaust into an exhaust recycling passage while flowing a second amount of engine exhaust through the exhaust catalyst, the first amount and the second amount adjusted by the controller based on the temperature.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for a turbocharged engine, comprising:
   determining whether a temperature of an exhaust catalyst is below a threshold via a controller based on an output from a temperature sensor located within the exhaust catalyst; and
   during a cold-start operation when the temperature of the exhaust catalyst is below the threshold,
      opening a restriction valve located upstream of the exhaust catalyst and downstream of a turbine to flow a first amount of engine exhaust into an exhaust recycling passage while flowing a second amount of engine exhaust through the exhaust catalyst, the first amount and the second amount adjusted based on the temperature of the exhaust catalyst;
   wherein the recycling passage couples an exhaust passage with an intake passage upstream of a compressor.

2. The method of claim 1, further comprising opening a wastegate to increase the first amount of engine exhaust by a third amount while flowing the first and second amounts.

3. The method of claim 2, wherein opening the restriction valve comprises commanding a motor actuator by the controller to rotate the restriction valve about an axis of a hinge of the restriction valve such that exhaust flow through the recycling passage increases, the hinge of the restriction valve downstream of a leading edge of the restriction plate with respect to exhaust flow in the exhaust passage, the restriction plate flush with an inside wall of the exhaust passage when in a closed position.

4. The method of claim 3, further comprising decreasing an opening of the restriction valve as the temperature of the exhaust catalyst increases.

5. The method of claim 4, further comprising decreasing an opening of the wastegate as the temperature of the exhaust catalyst increases concurrently with decreasing the opening of the restriction valve.

6. The method of claim 4, further comprising when the temperature of the exhaust catalyst is at or greater than the threshold, closing the restriction valve and operating the wastegate based on engine operating conditions, the engine operating conditions including one or more of a boost pressure and a driver demanded torque; wherein the boost pressure is determined by the controller based on output from a boost pressure sensor, and the driver demanded torque is determined by the controller based on output from a pedal position sensor.

7. A system comprising:
   an exhaust manifold having a restriction valve controlling a first amount of untreated exhaust flowing into a compressor inlet via a passage coupling the exhaust manifold upstream of an exhaust catalyst and the compressor inlet, the restriction valve rotating about a hinge of the restriction valve located on a downstream end of a plate of the restriction valve with respect to exhaust flow in the exhaust manifold; and
   wherein the restriction valve, in any position, allows at least a second amount of untreated exhaust to flow to an exhaust gas sensor and subsequently to the exhaust catalyst through an open area between the restriction valve and an inner wall of the exhaust manifold, both the exhaust gas sensor and the exhaust catalyst located in the exhaust manifold downstream of the restriction valve.

8. The system of claim 7, further comprising a controller with non-transitory instructions stored in memory, including instructions for adjusting an opening of the restriction valve based on a temperature of the exhaust catalyst to divert the first amount of untreated exhaust to the compressor inlet when the temperature of the exhaust catalyst is below a threshold temperature; wherein the temperature of the exhaust catalyst is determined based on an output from a temperature sensor located within the exhaust catalyst.

9. The system of claim 8, wherein the controller further includes instructions for closing a low pressure exhaust gas recirculation valve, and adjusting the opening of the restriction valve based on a desired exhaust gas recirculation amount to divert the second amount of untreated exhaust to the compressor inlet when the temperature of the exhaust catalyst is above the threshold temperature and when fouling of a low pressure exhaust gas recirculation cooler is detected; wherein the fouling is determined based on a change in a differential pressure across the low pressure exhaust gas recirculation cooler greater than a threshold pressure change.

10. A system, comprising:
    an exhaust passage;
    an oxygen sensor;
    a restriction valve positioned upstream of an emission control device and downstream of both of a turbine and a wastegate in the exhaust passage; and
    a pre-catalyst exhaust recycling passage coupled to the exhaust passage via the restriction valve to flow engine exhaust into an intake passage upstream of a compressor inlet during cold-start conditions;
    wherein the restriction valve includes a restriction plate and the restriction valve includes a hinge, the restriction plate rotating about an axis of the hinge, the hinge downstream of a leading edge of the restriction plate with respect to exhaust flow in the exhaust passage, the restriction plate flush with an inside wall of the exhaust passage when in a closed position, the oxygen sensor positioned in the exhaust passage on an opposite wall of the exhaust passage from the hinge and downstream of the leading edge of the restriction plate and upstream of a catalyst.

11. The system of claim 10, wherein the oxygen sensor is located in the exhaust passage downstream of the restriction valve and upstream of the emission control device.

12. The system of claim 10, wherein the restriction plate comprises a metal material.

13. The system of claim 12, wherein the restriction plate includes an open configuration, the open configuration of the restriction plate blocking a first amount of engine exhaust and diverting the first amount of engine exhaust into the recycling passage.

14. The system of claim 13, wherein the restriction plate in the open configuration allows a second amount of engine exhaust to flow through the emission control device.

15. The system of claim 12, wherein the restriction plate includes a closed configuration, the closed configuration of the restriction plate allowing all of the engine exhaust to flow through the emission control device.

16. The system of claim 12, wherein the restriction plate rotates up to 90 degrees about the axis of the hinge.

17. The system of claim 12, wherein the restriction plate rotates up to 180 degrees about the axis of the hinge.

18. The system of claim 10, further comprising a controller with computer readable instructions for:
  determining a temperature of the emission control device based on an output from a temperature sensor located within the emission control device; and
  determining an opening of the restriction valve based on the temperature of the emission control device to flow an amount of engine exhaust into the recycling passage.

* * * * *